US010346020B2

(12) United States Patent
Chirogene et al.

(10) Patent No.: US 10,346,020 B2
(45) Date of Patent: Jul. 9, 2019

(54) RELATIVELY CHANGING A PARAMETRIC VALUE USING A PRESSURE SENSITIVE USER INTERFACE ELEMENT

(71) Applicant: Adobe Inc., San Jose, CA (US)

(72) Inventors: Christopher Chirogene, Hamburg (DE); Sören Ammedick, Hamburg (DE)

(73) Assignee: Adobe Inc., San Jose, CA (US)

( * ) Notice: Subject to any disclaimer, the term of this patent is extended or adjusted under 35 U.S.C. 154(b) by 250 days.

(21) Appl. No.: 15/298,558

(22) Filed: Oct. 20, 2016

(65) Prior Publication Data

US 2018/0113601 A1 Apr. 26, 2018

(51) Int. Cl.
*G06F 3/048* (2013.01)
*G06F 3/0484* (2013.01)
*G06F 3/0488* (2013.01)
*G06F 3/01* (2006.01)

(52) U.S. Cl.
CPC .......... *G06F 3/04847* (2013.01); *G06F 3/016* (2013.01); *G06F 3/0488* (2013.01); *G06F 3/04883* (2013.01)

(58) Field of Classification Search
CPC .............................. G06F 3/048; G06F 3/04847
See application file for complete search history.

(56) References Cited

U.S. PATENT DOCUMENTS

| 6,760,041 | B2 * | 7/2004 | Komata | G06F 3/0481 |
| | | | | 345/652 |
| 7,254,775 | B2 * | 8/2007 | Geaghan | |
| 2005/0163368 | A1 * | 7/2005 | Hanamoto | G06T 5/009 |
| | | | | 382/162 |
| 2008/0094367 | A1 * | 4/2008 | Van De Ven | G06F 3/0414 |
| | | | | 345/173 |
| 2008/0105470 | A1 * | 5/2008 | Van De Ven | G06F 3/0414 |
| | | | | 178/18.01 |
| 2017/0070659 | A1 * | 3/2017 | Kievsky | H04N 5/23206 |

\* cited by examiner

*Primary Examiner* — Mahelet Shiberou
(74) *Attorney, Agent, or Firm* — Finch & Maloney PLLC

(57) ABSTRACT

Techniques are disclosed for relatively changing a parameter value from a first value using a pressure sensitive user interface (UI) element. In an embodiment, the techniques include: activating the UI element in response to pressure signals received at the UI element; displaying the first value as the parameter value; converting the pressure signals to corresponding parametric values; presenting the parametric values as feedback concurrently with the converted pressure signals and with the displayed first value; unlocking the activated UI element when the parametric values fall within a first window of the first value for a first time period; after the unlocking of the activated UI element, relatively changing the parameter value from the first value to the parametric values concurrently with the displayed parametric values; and deactivating and locking the UI element in response to a lack of pressure signals received at the touch point of the UI element.

17 Claims, 12 Drawing Sheets

US 10,346,020 B2

RELATIVELY CHANGING A PARAMETRIC VALUE USING A PRESSURE SENSITIVE USER INTERFACE ELEMENT

FIELD OF THE DISCLOSURE

This disclosure relates to a pressure sensitive user interface (UI) element, and more particularly, to techniques for relatively changing a parametric value using the pressure sensitive UI element.

BACKGROUND

Touch sensitive devices allow users to input signals. These input signals may be used, for example, to change the value of screen brightness, volume, zoom level, or some other adjustable parameter value. These values will be generally referred to herein as parametric values or parameters. The signals are input to the devices through touch sensitive interfaces. Example interfaces include graphical user interface (GUI) control features such as slide controls or rotatable knobs or needles that can be presented via a touch screen display and manipulated by user touch to change a given parametric value. For instance, the user can access a virtual slide bar control feature for adjusting screen brightness by touching and manipulating the slide bar until a desired screen brightness is achieved. More recently, touch sensitive devices not only respond to touch but also to pressure of the touch, thereby enabling multidimensional UI control features. However, there are a number of non-trivial issues associated with such pressure sensitive UI elements.

DETAILED DESCRIPTION

Figure 1:
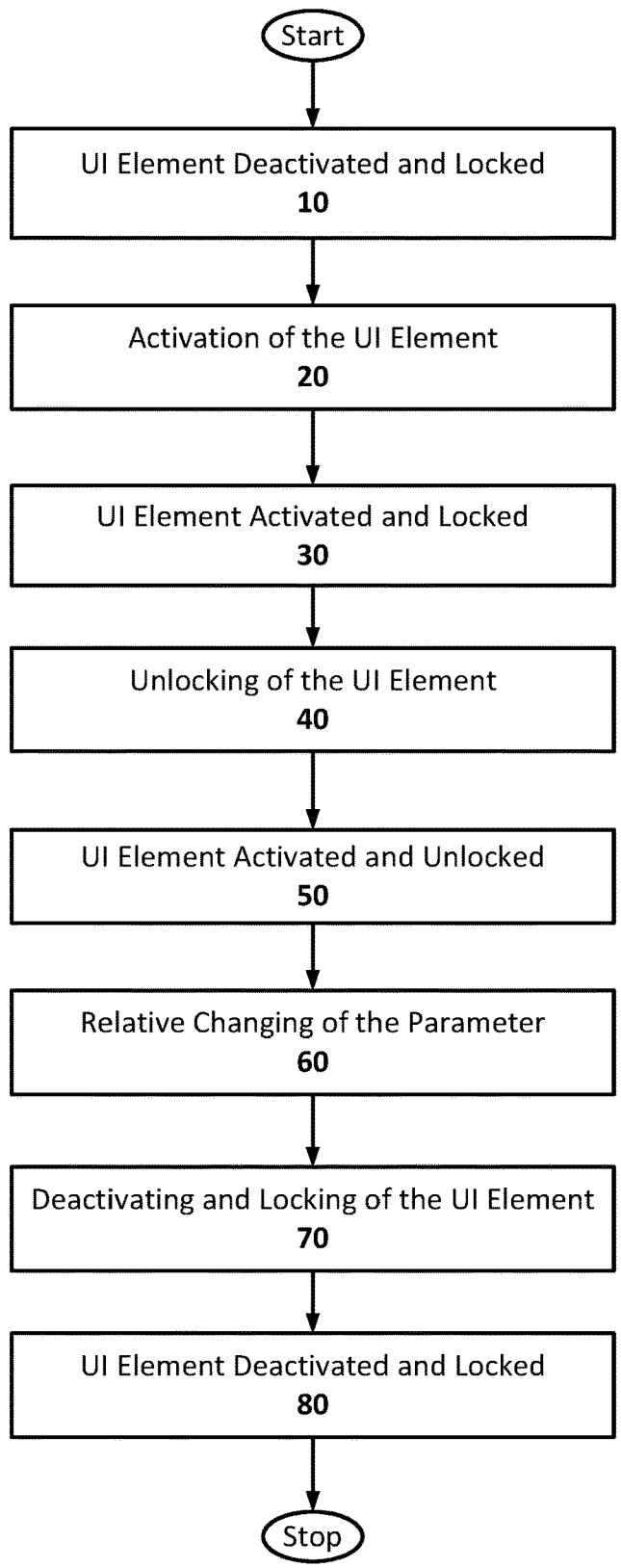
FIG. 1 illustrates the modes and mode changes of a pressure sensitive UI element that make up the basic framework of relatively changing a parametric value using the pressure sensitive UI element, in accordance with an embodiment of the present disclosure.

As previously noted, there are a number of non-trivial issues associated with pressure sensitive UI elements. For example, adjusting a parametric value with a pressure sensitive UI element may be cumbersome depending on the current value of the parameter being adjusted. For instance, the initial pressure applied to the pressure sensitive UI element may be at a minimum or otherwise not close to the pressure corresponding to the current value of the parameter. This results in a change that is relative to the parameter value corresponding to the initial pressure rather than a change that is relative to the current parameter value. For instance, and by way of example, assume a numeric parameter ranges from −100 to +100 and is currently set to +25, and further assume it is desired to change the value from +25 to +77 with a pressure sensitive UI element that proportionately maps the amount of pressure to the parametric value. In this example scenario, the smallest pressure corresponds to a parameter value of −100 and the largest pressure corresponds to a parameter value of +100, and the various intermediate pressures correspond to proportional parameter values somewhere between −100 and +100. Ideally, the user input would begin with the user initially providing the precise pressure that corresponds to the current setting of +25. Practically speaking, this is not likely to happen. Rather, what is more likely is that a minimum amount of pressure will be registered at the beginning of the user input, causing the parameter to effectively jump from its current setting of +25 to its minimum value, −100. From there, the pressure then can be adjusted by the user to produce a setting of +77. Note that this parameter input sequence (from +25 to −100 to +77) may produce an unexpected result or otherwise diminish the user experience. For instance, if the goal were to increase display brightness from +25 to +77, the user would expect to see a brightening of the display. However, the user might instead see an initial dimming of the display followed by a brightening of the display.

Thus, techniques are disclosed herein for changing a value of a parameter from an initial value using input provided by way of a pressure sensitive UI element of a display screen. The display screen may be, for example, a touch sensitive touch screen of a smart phone or tablet computer, although any number of touch screen computing systems can be used. In any case, the change commences relative to the current parameter value, rather than the parameter value associated with the initial applied pressure. As such, there is no surprising jump or other unexpected manifestation of the parameter change. Instead, the change is effected (and hence manifested) only after determining the applied pressure of the given user input is within a predefined tolerance of the current parameter value. For example, in one embodiment, the user simply and intuitively applies the amount of pressure needed to reach the parameter's current value (e.g., +25) and from that point on, the user uses changes in pressure to relatively adjust the value proportionately. So, if the parameter is screen brightness, for instance, the user will only see a change in brightness after the pressure has been sufficiently homed on the current value of +25. In some embodiments, feedback is used to facilitate the homing process and assist the user in finding the starting pressure associated with the current value. The feedback may be, for example, visual, audible, and/or tactile.

FIG. 1 illustrates the modes and mode changes of a pressure sensitive UI element that make up the basic framework of relatively changing a parametric value using the pressure sensitive UI element, in accordance with an embodiment of the present disclosure. As can be seen in this example case, the UI element starts in a deactivated and locked state 10. In some embodiments, when the UI element is activated 20 by an initial touch, a pressure indicator is revealed to inform the user how close the current amount of pressure is to the current parametric value without affecting the parameter's value itself. Here the UI element is in an activated and locked state 30.

As will be appreciated in light of this disclosure, this visual feedback can be used to assist the user in finding or otherwise homing in on the starting pressure associated with the current value. In other embodiments, audio feedback is used (e.g., beeping tone that transitions to a solid tone once pressure is in tolerance). In still other embodiments, tactile feedback is used (e.g., low frequency vibration that transitions to a high frequency vibration once pressure is in tolerance). In still other embodiments, no feedback is provided to the user. In any such cases, once the amount of pressure sufficiently matches the parameter's value (within the predefined tolerance), the UI element unlocks 40. At this point, the UI element is in activated and unlocked state 50. Accordingly, further changes in pressure can then be used to effect change (i.e., relative change 60) on the parameter's value and therefore manifest that change (e.g., increase display brightness or volume). When the user is done changing the parameter's value (e.g., by removing any applied pressure from the pressure sensitive UI element), the UI element deactivates and locks 70. Then the UI element returns to the deactivated and locked state 80. The process may be repeated for any parameter adjustment based on a pressure sensitive user interface control feature.

A number of benefits associated with various embodiments of the present disclosure will be appreciated. For example, the techniques provided herein allow a pressure sensitive interface to be used for changing the value of a parameter, such as a control signal that controls a device or an application. Since screen sizes on many touch sensitive display screens are relatively small, it may be cumbersome to change such parameters using other UI elements, such as horizontal or vertical slide controls (sliders) or circular knobs or gauges. Pressure sensitive UI elements, which may include for instance a pressure sensitive component as small as a touch point or other relatively small footprint control feature (accessible with a finger or stylus), may be operated without obscuring any more of the screen than the touch point. Further, a pressure sensitive UI element that allows the parameter value to be relatively changed from the parameter's current value provides for a more intuitive and tactile-friendly technique to adjust the parameter's value.

For instance, in some embodiments, there is a graphical depiction of the converted pressure values and their mapping to corresponding parameter values. The same graphical depiction may also be used to display the current parameter value. This allows a more user-friendly way to "lock on" to the current parameter value (that is, adjust the applied pressure at the touch point to reach the pressure corresponding to the current parameter value), from which relative adjusting of the parameter seems more natural. In addition, the parameter may control an aspect of an electronic device (e.g., volume of a speaker) or an application executing on the electronic device (e.g., zoom level in a satellite image application). Accordingly, in some embodiments, relatively changing the parameter value causes concurrent (e.g., real time) and corresponding changes to the aspect being controlled by the parameter. Again, this allows further user friendly and appropriate parameter setting by providing this additional level of feedback with the pressure sensitive UI element.

To recount, changes in the values of a pressure sensitive UI element are received but not acted upon until the given pressure on that UI element sufficiently corresponds to the current value of that parameter. In this sense, the UI element remains locked until a suitable match condition is found. Once the given pressure is sufficiently matched to the current parameter value, the UI element is unlocked and any further changes in the values of a pressure sensitive UI element are acted upon.

In further detail, and according to an embodiment including a mobile computing device configured with a touch screen and a pressure sensitive UI element displayed thereon, the UI element is first activated in response to a user applying pressure to a touch point of the UI element. The applied pressure is converted into corresponding parametric values. This conversion may take place concurrently with applying the pressure. The parametric values are displayed or otherwise communicated to the user (as part of the activated UI element) concurrently with this conversion, according to some embodiments. The activated UI element is then unlocked so that it is capable of changing the value of the parameter. For example, in some embodiments, this unlocking takes place when the parametric values fall within a set or predetermined window (e.g., +/−10%) of the current/target parameter value for a set or predetermined time period (e.g., half a second, or some other suitable threshold). Removing the applied pressure may be used to stop further changes to the parameter, and to deactivate and lock the UI element.

Once unlocked, increasing or decreasing the pressure applied to the touch point of the pressure sensitive UI element causes a corresponding (e.g., proportional) increase or decrease to the parameter currently associated with the UI element. This increase or decrease of the parameter may take place concurrently (e.g., in real time, or simultaneously) with the corresponding applied pressure. The touch point may be, for example, an icon or small shape on a smartphone display. Such changing of the parameter is referred herein as "relatively changing" the parameter since the change takes place from the current value of the parameter and responds in correspondence (e.g., proportion) to the applied pressure of the touch point. In some embodiments, such as when the parameter controls an aspect of a device (e.g., volume of a speaker) or an application (e.g., brightness of a video in a video processing app), relatively changing the parameter causes a corresponding and concurrent (e.g., real time) change to the aspect of the device or application. For example, the speaker volume correspondingly increases or decreases while the parameter is being relatively changed using the pressure sensitive UI element.

Herein, "proportional" may refer to direct (linear) proportion, but in other embodiments may encompass a broader context. For example, in some embodiments, the parameter is assumed to take on values in a range, and "proportional" with respect to the amount of pressure applied refers to a monotonic or exponential relationship with the range (or a displayed interface of the range), from one end of the range to the other. For instance, in some embodiments, the range (of the parameter value) is discretized into a finite number of ordered values (such as evenly spaced values, in some cases), and the different possible measured pressure values similarly ordered. The increasing pressure values are then assigned to the increasing parameter values. In some example embodiments, the range is on a logarithmic scale or other monotonic conversion to allow for a better (e.g., more intuitive) visual presentation in the UI element or for a better mapping to the possible pressure values, depending on factors such as what the parameter value represents.

In some embodiments of the present disclosure, techniques are coded into a non-transitory medium to provide a computer-implemented methodology. The methodology includes activating a pressure sensitive UI element in response to pressure applied to a touch point of the UI element. The UI element is part of a graphical user interface that is presented and accessible by a touch sensitive display screen of a computing device, such as a smartphone, tablet computer, or television. The initial or current value of a parameter to be controlled by the UI element is displayed as part of the activated UI element, according to some embodiments. For example, the parameter value may be displayed on a horizontal or vertical slider control, or a rotatable knob or gauge, such as a circular knob or analog speedometer. The pressure values are converted to corresponding parametric values concurrently with receiving the pressure values. In addition, these parametric values are displayed or otherwise communicated to the user as feedback from the pressure values as part of the activated UI element concurrently with converting the pressure values. For example, in some embodiments, the corresponding parameter values are displayed on the same horizontal or vertical slider as the current value of the parameter. Numerous variations and other example embodiments will be appreciated in light of this disclosure.

To reduce or prevent inadvertent changes or absolute changes of the parameter value, in some embodiments, the activated UI element is normally locked. Such a locked UI element is incapable of changing the parameter value. The activated UI element may then be unlocked when a set or predetermined heuristic is achieved. The unlocked UI element is capable of changing the parameter value. The heuristic may be, for example, time or proximity based, such as when the corresponding parametric values fall within a set or predetermined window of the current value of the parameter (e.g., within 5 or 10 percent of the current value) for a set or predetermined time period (such as a quarter or half a second). These heuristic values are configurable (for example, by the user), according to some embodiments, while in others are hard-coded. Once unlocked, the value of the parameter may be relatively changed from the current value to the parametric values concurrently with displaying the parametric values on the unlocked UI element. In addition, in some embodiments, the parametric values are displayed as the value of the parameter concurrently with relatively changing the value of the parameter. For instance, the same indicator and the same display interface (e.g., same horizontal or vertical slider, or same rotatable knob or needle) may be used to display both the parameter value and the converted pressure values.

In some embodiments, the correspondence of the parametric values to the pressure values is a proportional correspondence. Here, the proportionality is not necessarily strict (e.g., linear) proportionality, but the term is intended to cover broader aspects of proportionality as would be appreciated in light of the present disclosure. For example, "proportionally" also applies when increasing the pressure gradually of the touch point of the UI element throughout the range of possible pressure values causes a similar gradual increase in the parameter from its minimum value to its maximum value. In some embodiments, the activated UI element includes a graphical depiction of the value of the parameter and of the displayed feedback from the pressure values. For example, the graphical depiction may be of a horizontal or vertical slider, or a rotatable knob or needle, or other such graphical depiction of a control of a one-dimensional parameter value. In other embodiments, digital values are displayed in place of some or all of the graphical depictions of the values.

In some embodiments, after unlocking the activated UI element, the graphical depiction of the value of the parameter is the same as the graphical depiction of the displayed feedback from the pressure values. For example, since the values coincide in the unlocked UI element, they can be displayed using the same graphical depiction, such as a shared bar or circle or other indicator on a horizontal slide control. In some embodiments, the graphical depiction includes a range of the value of the parameter. For instance, with a horizontal or vertical slider, one end of the slider may represent the minimum value of the parameter (or converted pressure value) while the other end may represent the maximum value of the parameter (or converted pressure value). In some embodiments, such as with the horizontal or vertical slider (or rotatable knob or needle), the value of the parameter is also controlled in response to touch signals applied to the linear slider or the rotatable knob or needle. For example, the parameter value may be controllable through both a pressure sensitive element (e.g., touch point) and a touch sensitive element (such as a horizontal slide control), the choice of which may be up to the discretion of the user.

Architecture and Methodology

Figure 2A:
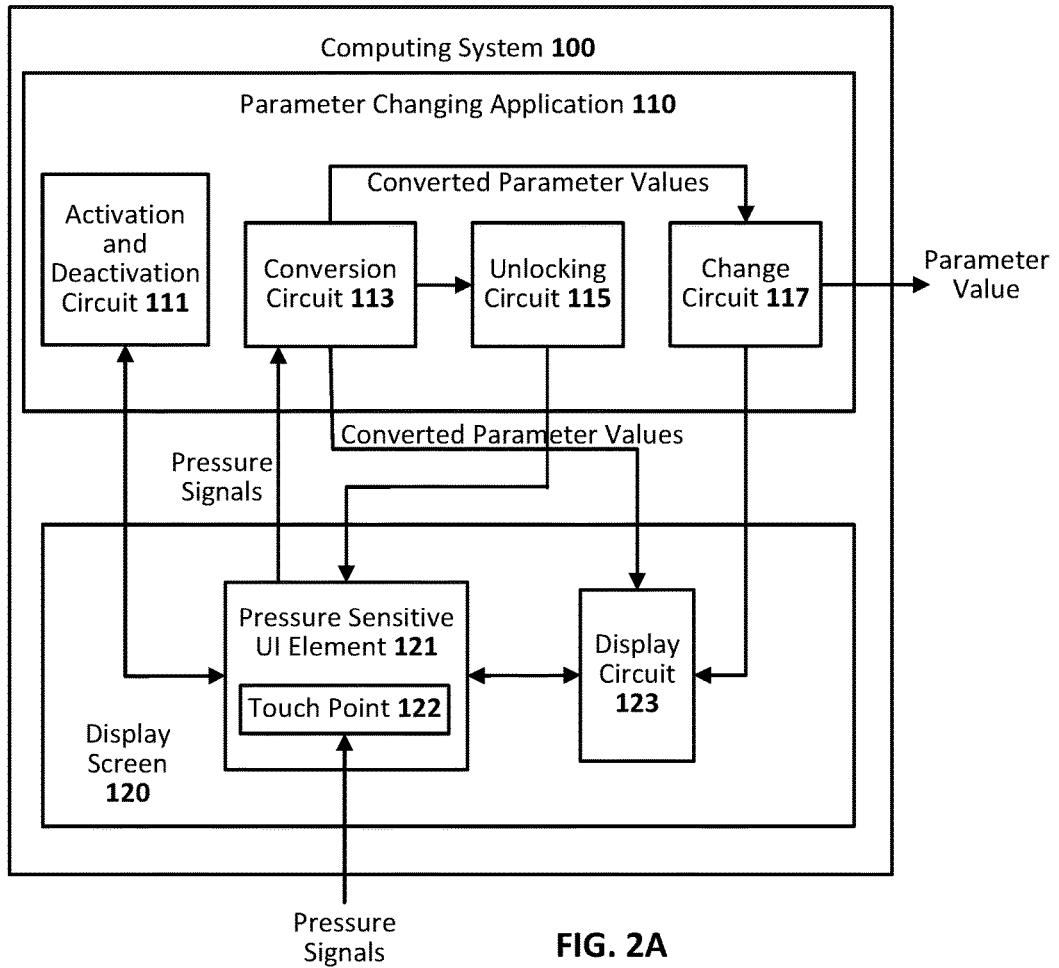
FIG. 2A illustrates a computing system including a parameter changing application configured to relatively change a value of a parameter from a current value using a pressure sensitive user interface (UI) element of a display screen, in accordance with an embodiment of the present disclosure.

FIG. 2A illustrates a computing system 100 including a parameter changing application 110 configured to relatively change a value of a parameter from a current value using a pressure sensitive user interface (UI) element 121 of a display screen 120, in accordance with an embodiment of the present disclosure. As can be seen, the parameter changing application 110 is executable on the computing system 100 and generally includes an activation and deactivation circuit 111, a conversion circuit 113, an unlocking circuit 115, and a change circuit 117. In addition, the display screen 120 (such as a touch sensitive display screen) is part of the computer system 100 and generally includes the pressure sensitive UI element 121 (which itself includes a pressure sensitive touch point 122 to receive pressure signals from a user) and a display circuit 123.

Figure 2B:
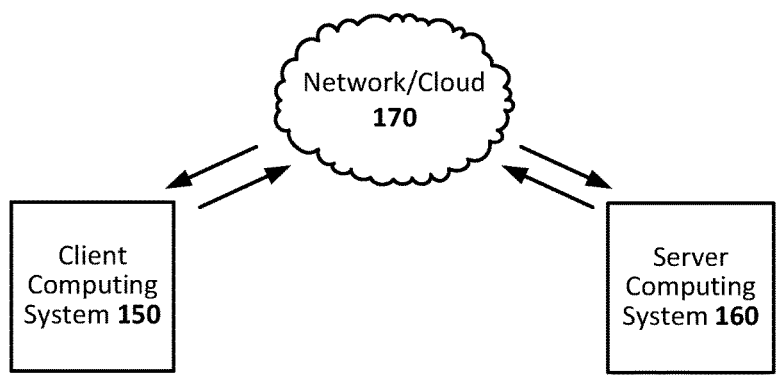
FIG. 2B illustrates a client-server system configured to relatively change a value of a parameter from a current value using a pressure sensitive UI element of a display screen, in accordance with another embodiment of the present disclosure.

FIG. 2B shows a computing system 150 (such as a client computing system) similar to that shown in FIG. 2A, except one or more of the components and features of the parameter changing application 110 are provided to the computing system 150 by a remote server computing system 160 accessible via a communication network or cloud-based service 170. The communication network 170 may be any wired and/or wireless network such as, for example, a wireless local area network operatively coupled to the Internet, or a campus wide network. Any number of communication networks and protocols and client-server arrangements may be used.

The parameter changing application 110 may be any product programmed or otherwise configured to allow for changing of parameter values (such as imaging or sound controls) through a pressure sensitive UI element 121. In some example embodiments, the parameter changing is done in the context of a tablet or smartphone interface, such as an application (app) interface running on the tablet or smartphone. By way of example, the parameter may adjust volume, image intensity or contrast, or serve as an input parameter to an app. Such software applications may be installed directly on the computing system 100 in a stand-alone fashion (such as shown in FIG. 2A), or accessible to the computing system 150 through a cloud-based service 170 (such as shown in FIG. 2B). In any case, the user may change the value of a parameter through a pressure sensitive UI element 121 in a relative fashion (that is, from the current value).

As will be appreciated in light of this disclosure, the parameter may be changed in a relative fashion from the current value using a pressure sensitive UI element, such as a touch point capable of detecting different applied pressures from a user. In some embodiments, the UI element further includes a graphical depiction of the applied pressures and the current value of the parameter, such as on a horizontal slide control. Such a UI element may further provide for a real time pressure indicator in relation to the parameter's current value without affecting change of this value. For example, in some embodiments, the UI element and accompanying application circuits automatically determine when the applied pressure (as converted to a corresponding parameter value) is within tolerance (close to the current parameter value) to start effecting change of the parameter value (e.g., unlock the UI element) and from then on, use pressure changes to relatively change the parameter's value.

Figure 3A:
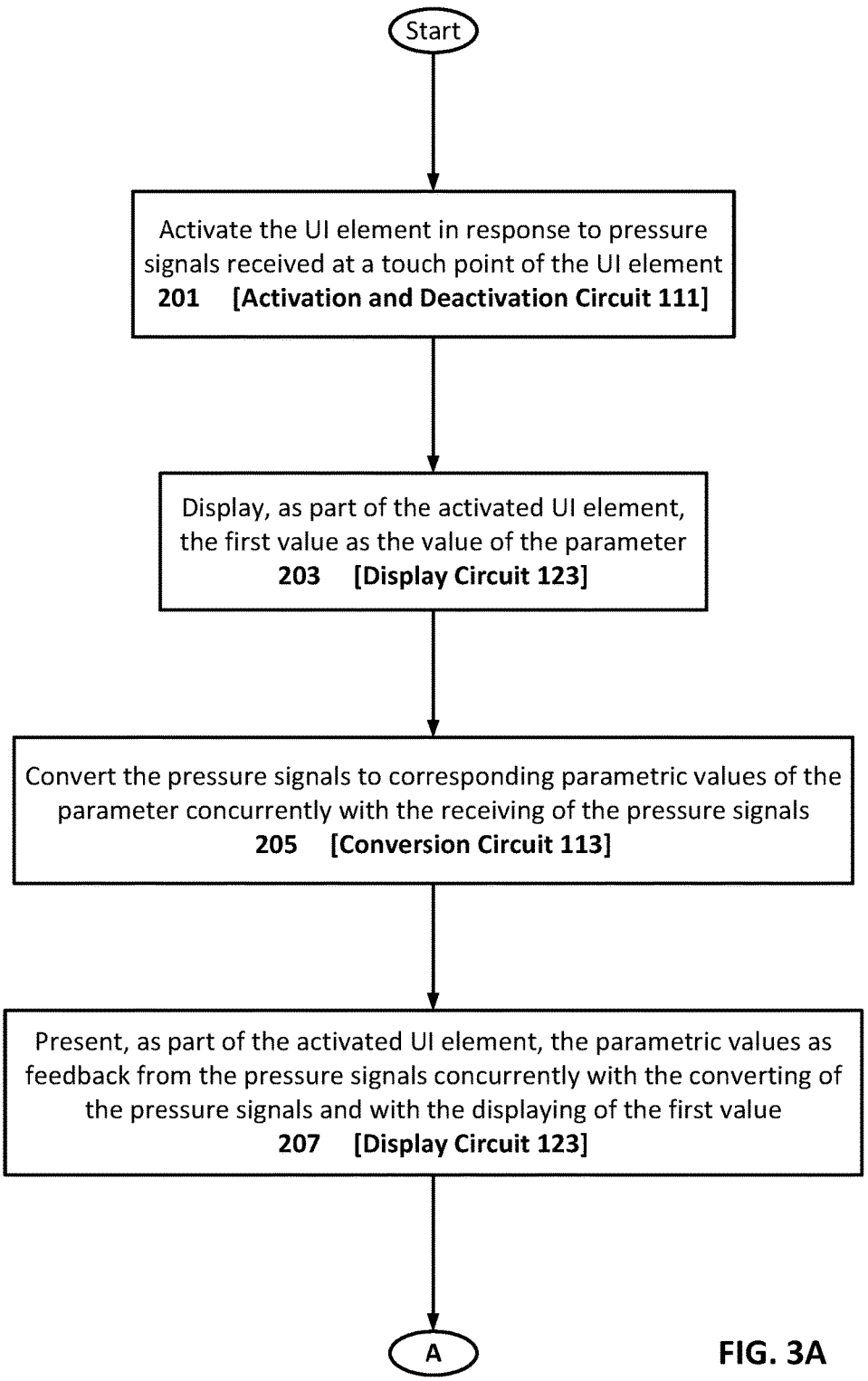
FIGS. 3A through 3B illustrate a computer-implemented method for relatively changing a value of a parameter from a current value using a pressure sensitive UI element of a display screen, in accordance with an embodiment of the present disclosure.

Further, in some embodiments, the UI element provides for a visual indicator of the parameter's current value and what its range is (e.g., endpoints of a linear slide control) as well as a visual indicator of where the current pressure being applied to the touch point corresponds to the parameter's current value. For instance, the UI element may provide for a visual real time pressure gauge indicator that provides visual feedback indicating how pressure changes applied to the touch point affect change of the parameter's value. In some embodiments, the pressure signals applied to the UI element are monitored to determine if the UI element has been activated, at which point pressure changes are continually monitored and the pressure gauge indicator (as converted to corresponding parameter values) updated accordingly. In addition, in some embodiments, when the current pressure is such to start effecting relative changes to the parameter's value, the UI element is unlocked and further changes to the pressure result in corresponding changes to the parameter's current value. For example, this unlocking may take place when the current pressure (as converted to a parameter value) is sufficiently close to the parameter's current value, such as within 10% of the parameter's range, and has remained there for a sufficient period, such as half a second. In some embodiments, the pressure signals applied to the activated UI element are monitored The operation of the systems shown in FIGS. 2A and 2B will be discussed with reference to FIG. 3A through FIG. 3B, which illustrate a computer-implemented method for relatively changing a value of a parameter from a current (or first) value using a pressure sensitive UI element of a display screen, in accordance with an embodiment of the present disclosure. As can be seen, the methodology includes activating 201 the UI element in response to pressure signals received at a touch point of the UI element, which is carried out by the activation and deactivation circuit 111. In some embodiments, the activation and deactivation circuit 111 is programmed or otherwise configured to respond to user-supplied pressure signals. The pressure signals may be provided, for example, through a pressure sensitive touch point (such as touch point 122) of the UI element. In some embodiments, supplying sufficient pressure (such as a light press) for a sufficient period (such as a small fraction of a second, as in a quarter of a second) activates the UI element, while removing any applied pressure deactivates the UI element.

Activation parameters are configurable (such as by the user) in some embodiments. For example, in some embodiments, the minimum amount of pressure needed to activate a UI element may be any value (such as a configurable value) between the minimum detectable pressure (e.g., more than noise) and one quarter of the maximum pressure. For further example, in some embodiments, the minimum period to activate a UI element may be any value (such as a configurable value) between a tenth of a second and a half of a second.

Returning to FIG. 3A, this activation causes the UI element to display a graphical depiction of a parameter together with the current value of the parameter. One such example embodiment is shown in FIGS. 4A through 4E. As can be seen, a multimedia project (such as a video with sound) has been authored using a digital content creation application. One of the parameters for controlling the display of the project, namely "Exposure," has been chosen to be relatively changed through a pressure sensitive UI element. The UI element includes a pressure sensitive touch point and a horizontal slide control with endpoints for the minimum and maximum values of the exposure parameter (e.g., between −4.0 and +4.0). Here, the current value of the exposure parameter is +1.3, as illustrated both graphically (on the horizontal slide control) and digitally (in a separate readout above the slide control).

Figure 4A:
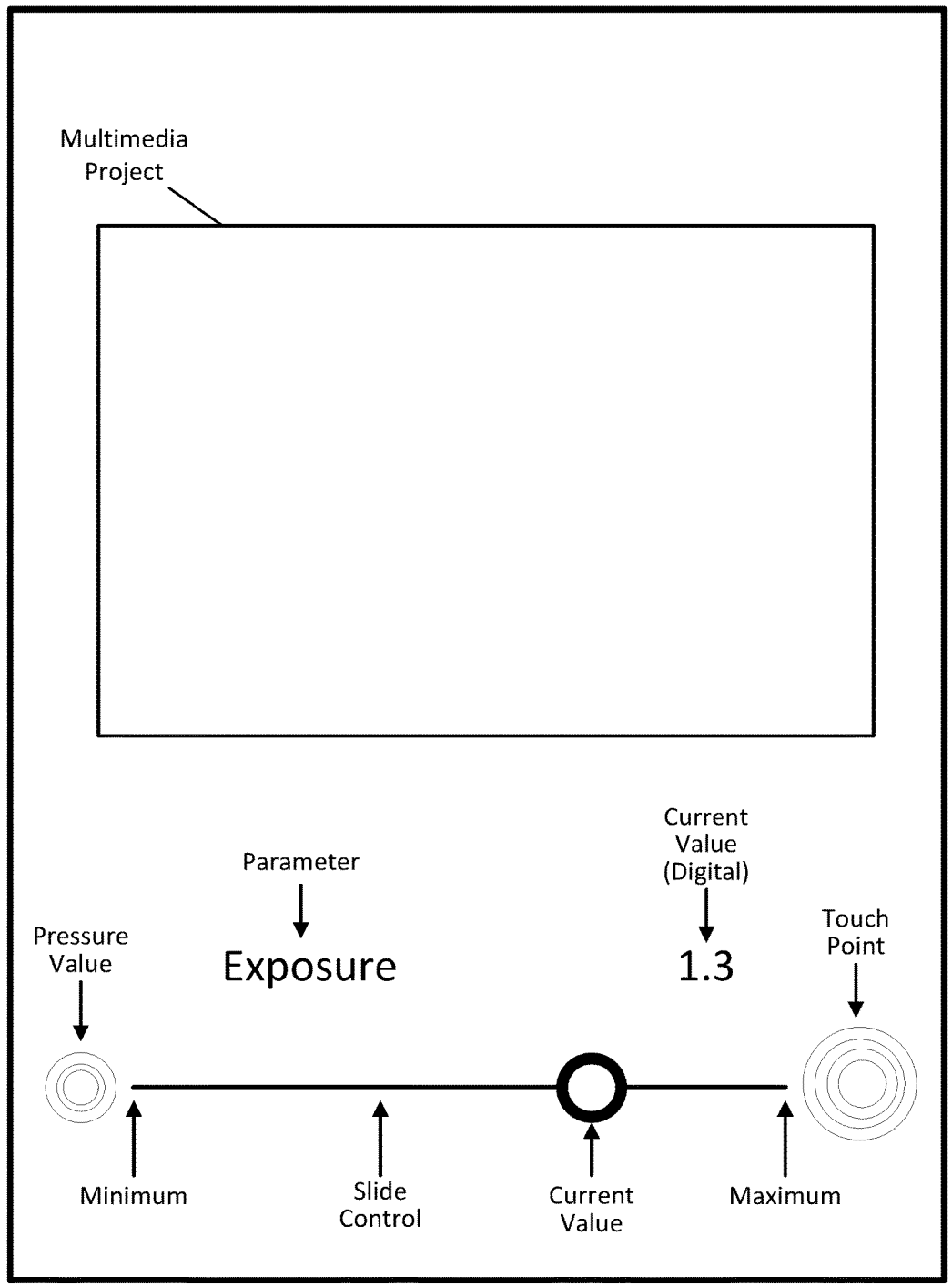
FIGS. 4A through 4E illustrate example screen shots of a multimedia application configured to relatively change a value of a parameter from a current value using a pressure sensitive UI element of a display screen, in accordance with an embodiment of the present disclosure.
Figure 4B:
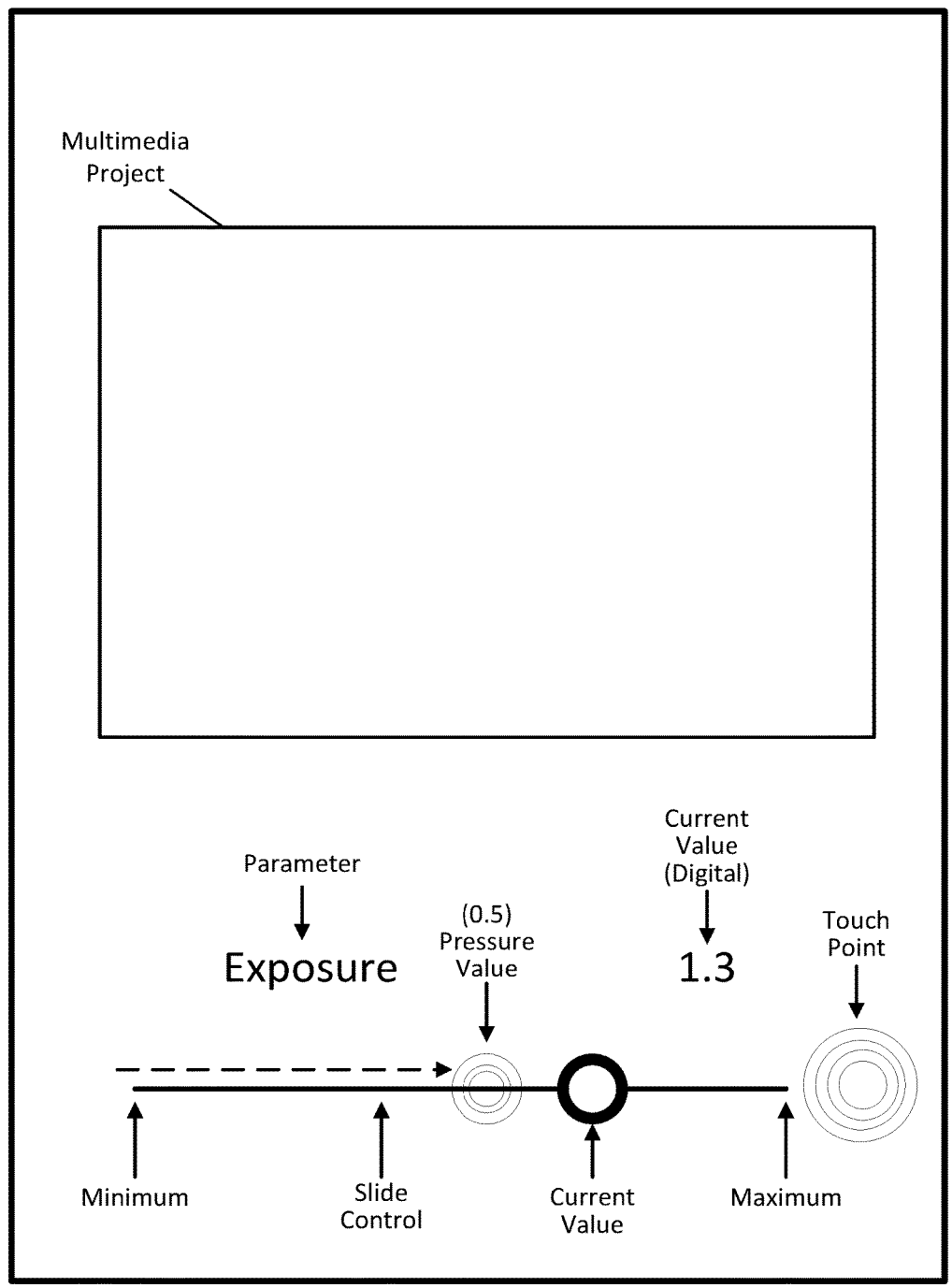
Figure 4C:
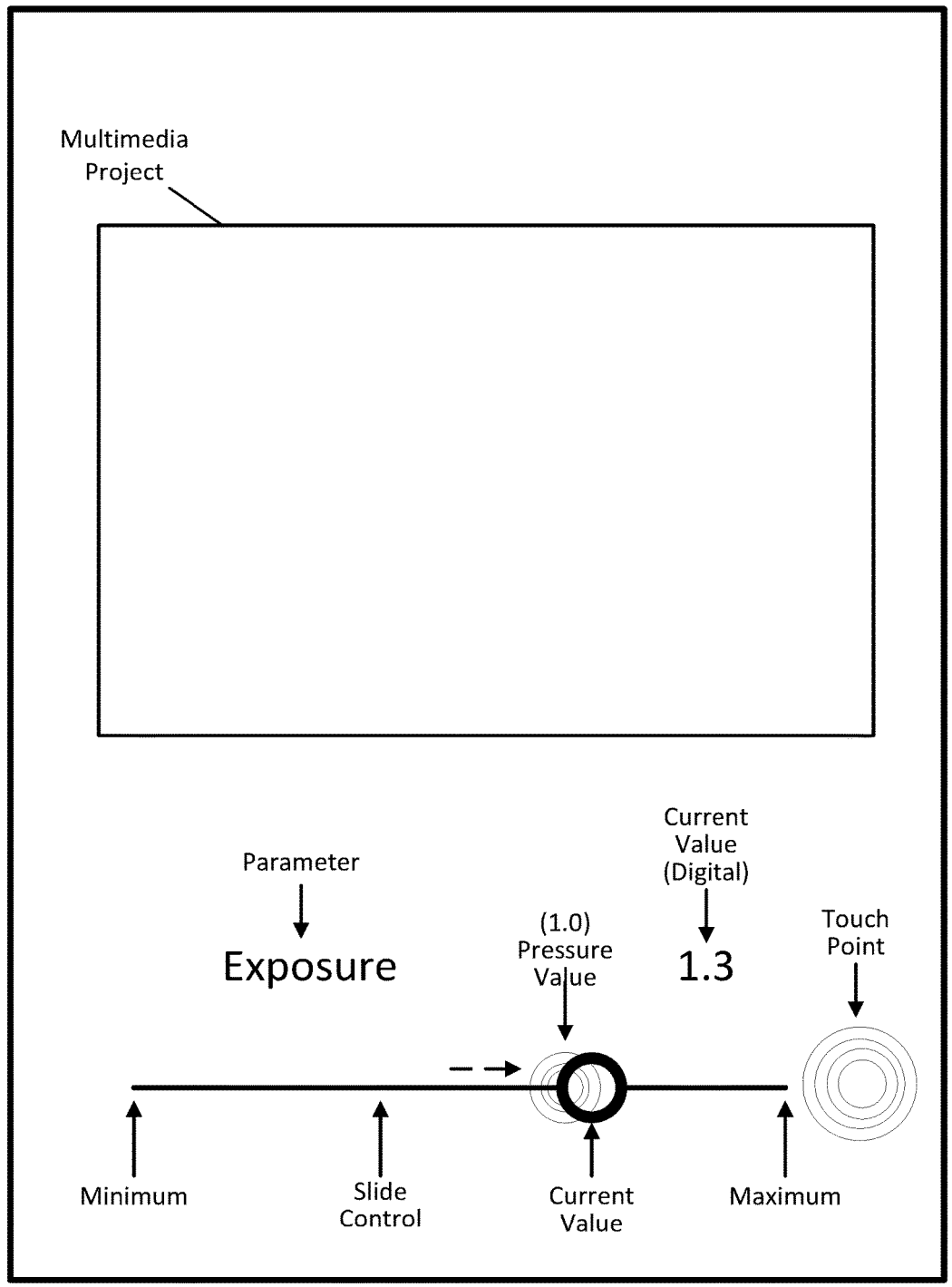

Prior to activation, as illustrated in FIG. 4A, there is no (or insufficient) pressure applied to the touch point, so the pressure value is not on the horizontal slide control (e.g., the pressure value is undefined). After activation by medium pressure (as applied, for example, by a user's finger or stylus), the pressure value is shown roughly halfway along the slide control, as illustrated in FIG. 4B. Here, the medium pressure signals correspond to an Exposure parameter setting of 0.5 (of a range from −4.0 to +4.0). The example project generally includes an image portion, such as a video. A particular video may have frames exhibiting greatly different contrasts within the same frame, such as white for snow and black for clothing. Accordingly, the Exposure control (as controlled by the Exposure parameter) may be useful in viewing or editing the video to make the content more meaningful. It should be noted that Exposure is an example parameter that may be controlled by the pressure sensitive UI element. Other parameters include volume, contrast, zoom, etc., as will be appreciated of this disclosure.

Returning to FIG. 3A, once the UI element has been activated, the methodology continues with displaying 203, as part of the activated UI element 121, the first (or current) value as the value of the parameter, which is caused or otherwise carried out by the display circuit 123. In general, the display circuit 123 is programmed or otherwise configured to control the contents of the display screen (such as display screen 120), including the displayed aspects of the UI element. In one such embodiment, the display circuit 123 causes display of a touch point, a graphical depiction of the parameter's range, and an indicator of the current value (or first value) of the parameter, as illustrated in FIG. 4A.

The methodology continues with converting 205 the pressure signals to corresponding parametric values concurrently with receiving the pressure signals, which is carried out by the conversion circuit 113. By way of example, the parameter may take on values of a range (from a minimum value to a maximum value). Further, the applied pressures (or pressure signals) may also take on values of a range (from a minimum value to a maximum value). In some embodiments, the conversion circuit 113 takes these pressure signals and converts them to corresponding parameter values (such as by a proportional mapping of the pressure value range to the parameter value range). For instance, in some embodiments, minimum pressure (e.g., enough pressure to activate the UI element) corresponds to the minimum value of the parameter, maximum pressure corresponds to the maximum value of the parameter, medium pressure corresponds to the medium value of the parameter, etc.

The methodology continues with presenting 207, as part of the activated UI element, the parametric values as feedback from the pressure signals concurrently with converting the pressure signals and with displaying the first value, which is carried out in some embodiments by the display circuit 123. For example, the presenting at 207 may be carried out visually (e.g., via displaying the parametric values corresponding to the given pressure), aurally (e.g., via an audible beep having a beep frequency that increases or is modulated as a function of how close the given pressure is to the first value), or tactilely (e.g., via a haptic element of a tactile display having a vibration frequency that increases or is modulated as a function of how close the given pressure is to the first value). As such, there may be a real time interface between the input pressure signals and the display (or a speaker for aural presentation, or a haptic element for tactile presentation) of their corresponding parameter values. Further, comparison of the current pressure signal and the current parameter value may be accomplished, such as illustrated in FIG. 4B.

According to some embodiments, as the input pressure signals vary, the displayed corresponding parameter value varies accordingly, allowing visual feedback of the effect of pressure applied to the pressure sensitive touch point and the corresponding parameter value associated with the pressure, which may aid in setting the value of the parameter to the desired value. For example, in FIG. 4C, the pressure applied to the touch point has been increased (to about 1.0) from that illustrated in FIG. 4B (about 0.5) so that the corresponding parameter value of this pressure is very close to the current value of the parameter.

In some embodiments, removing the applied pressure causes the activated UI element to deactivate (e.g., the reverse process of activating the UI element), which is carried out by the Activation and Deactivation Circuit 111. To help avoid misinterpreting decreasing pressure (to lower the corresponding parameter value) and removing applied pressure (to deactivate the UI element), in some embodiments, there is a delay (such as 0.3 seconds) between the decreased pressure and reflecting the parameter value with the new pressure. If the applied pressure is removed during this delay period, it is assumed the user wants to deactivate the UI element, and the parameter value remains the same as at the start of the delay period. In some embodiments, the Activation and Deactivation Circuit 111 is two separate circuits, one for activation and one for deactivation. In some embodiments, the delay period for deactivation is configurable, such as by the user. In some embodiments, the delay period is a window, with parameter values being updated in real time with the pressure changes, but removing of applied pressure causing the parameter value to return to the value it held at the beginning of the window (e.g., 0.3 seconds earlier).

Figure 3B:
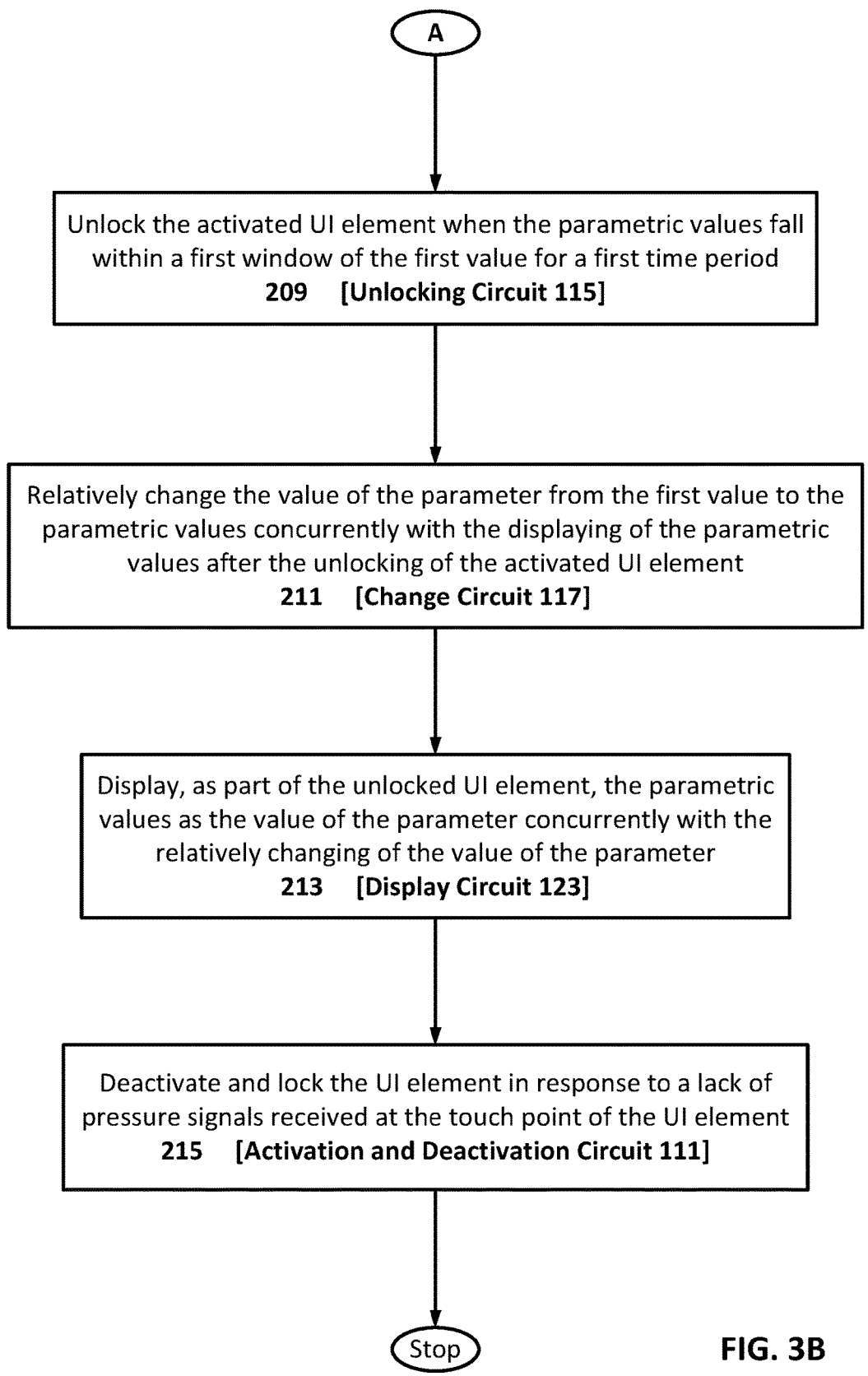

Referring now to FIG. 3B, the methodology continues with unlocking 209 the activated UI element when the parametric values fall within a first window of the first value for a first period, which is carried out by the unlocking circuit 115. To relatively change the parameter through a pressure sensitive interface, the user should be applying a similar pressure (e.g., to the touch point) to that corresponding to the current (first) value of the parameter. However, that amount of pressure may not be known (or may not be intuitive) to the user, and may vary with device, UI element, settings, or the like. Accordingly, by providing feedback (such as real time feedback) of the applied pressure to the corresponding parameter value, the user can visualize and feel the amount of pressure needed to bring the UI element to the corresponding current value of the parameter.

In addition, by having an activated and locked UI element, the user can "zero in" (e.g., approach, within a set, predetermined, or specified tolerance) on the right amount of pressure to correspond to the current value of the parameter. An example activated and locked UI element is a UI element whose pressure signal input is being displayed as corresponding values of the parameter to control, but the UI element does not (yet) control the value of the parameter. After this "zeroing in," in some embodiments, the UI element unlocks, allowing further pressure signal changes to cause corresponding changes in the parameter value. To prevent inadvertent or accidental unlocking, the pressure signals (and in turn, their corresponding parameter values) should be reasonably close to (e.g., within 5% or 10% of) the current value of the parameter, as measured from the entire range of the parameter. For instance, if the parameter takes on values from 0 to 100, and has a current value of 67, then within 5% of the current value means between 62 and 72, and within 10% of the current value means between 57 and 77.

Furthermore, to prevent still further risk of inadvertent unlocking, in some embodiments, there is a time requirement, such as a half a second, for which the pressure signals need to be within the above range of the current value for the UI element to unlock. The time period for the pressure signals can be analogized to the double click event on a computer mouse, while the window (or proximity) aspect of the applied pressure can be analogized to hovering with a computer mouse over a desired icon or other screen feature. Thus, the unlocking step can be thought of as moving the pressure signal feedback (by varying the applied pressure accordingly) to the current value of the parameter and waiting sufficient long (e.g., a fraction of a second, such as a third or a half of a second) for the unlocking to engage and link the UI element to the direct control of the parameter.

In some embodiments, the window or proximity boundaries and the time periods are settable or user configurable. By way of example, in FIG. 4C, the pressure value is close to the current value of the parameter (within about 5% with respect to the range of the parameter value). Accordingly, in some embodiments, if maintained for a sufficient period of time (such as half of a second) at this or similar pressures, the UI element is unlocked. For example, in some embodiments, the minimum proximity needed to unlock a UI element may be any value (such as a configurable value) between 2% and 15% of the overall range of the parameter. For further example, in some embodiments, the minimum period to unlock a UI element may be any value (such as a configurable value) between a quarter of a second and one second.

With further reference to FIG. 3B, the methodology continues with relatively changing 211 the value of the parameter, which is carried out by the change circuit 117. For example, in some embodiments, the value of the parameter is changed from the first value to the parametric values concurrently with displaying the parametric values. That is, instead of remaining fixed at the current value, the value of the parameter changes to match those of the parametric values (which vary with the applied pressure). This takes place after unlocking the activated UI element, and allows the UI element to relatively change the parameter value (i.e., relative from the current value of the parameter). This changing may take place in real time, and in some embodiments, the indicator for the pressure value in the UI element coincides with or is identical to the indicator for the current value of the parameter during the relatively changing portion (e.g., after unlocking the UI element). In some embodiments, such as when the parameter controls an aspect of a device or application, relatively changing the value of the parameter causes a corresponding and concurrent (e.g., in real time) change in the aspect of the device or application being controlled by parameter. By way of example, if the parameter controls the volume of a speaker that is currently playing music, then after unlocking the UI element, relatively changing the parameter causes simultaneous corresponding changes in the speaker volume, which provides further feedback for setting the parameter to the desired level using the pressure sensitive UI element.

Figure 4D:
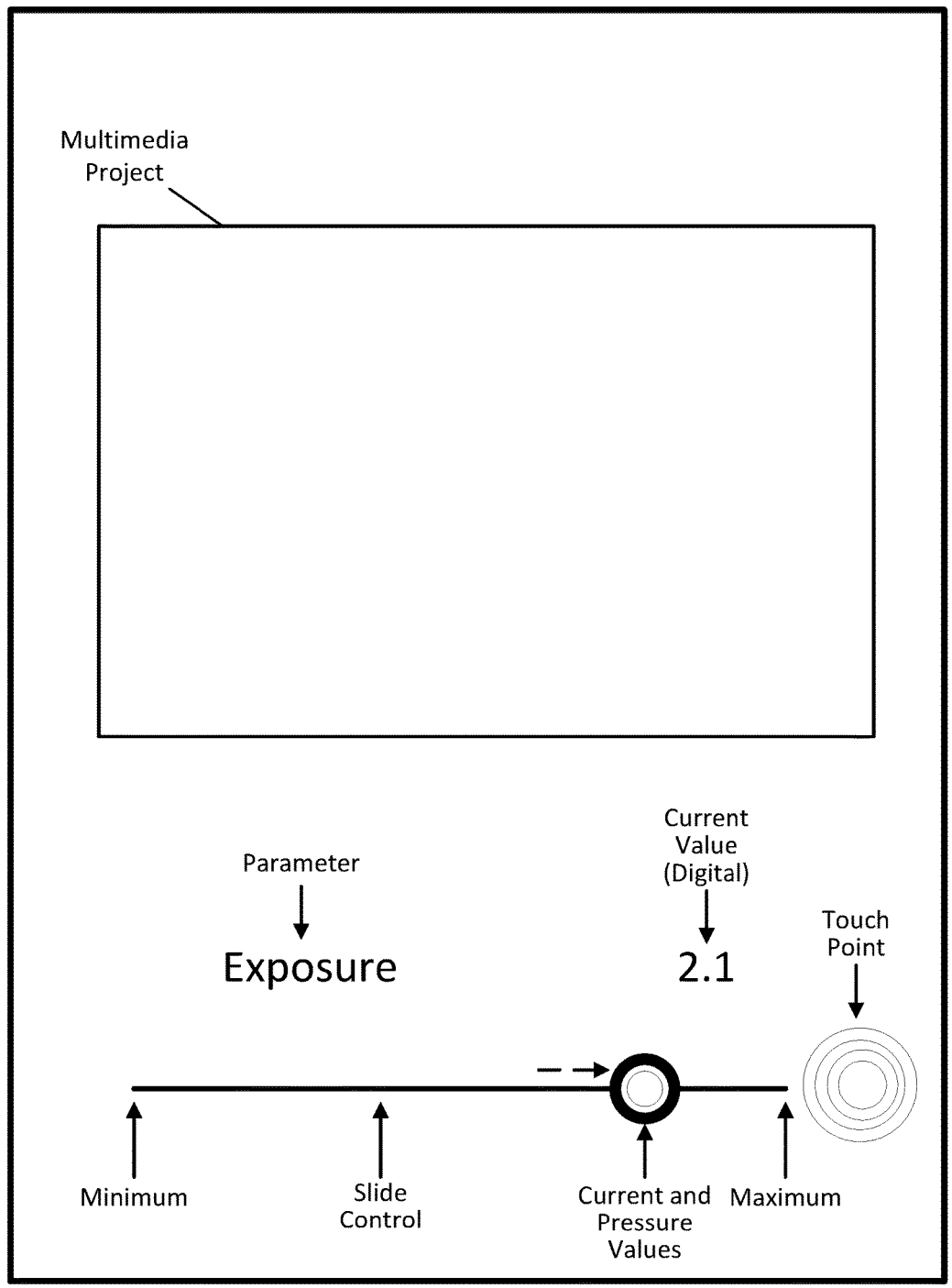
Figure 4E:
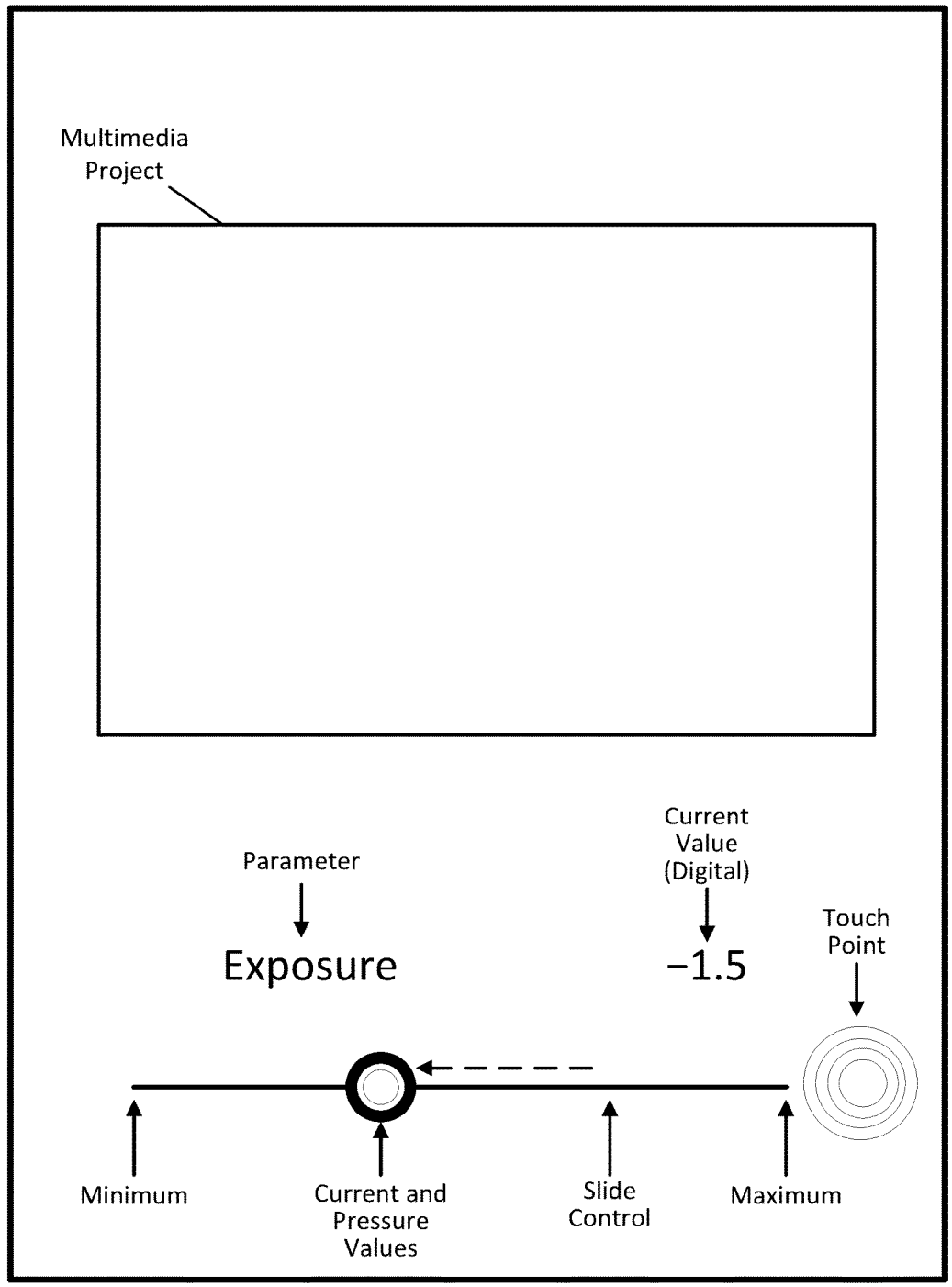

With further reference to FIG. 3B, the methodology continues with displaying 213, as part of the unlocked UI element, the parametric values as the value of the parameter concurrently with relatively changing the value of the parameter, which is carried out by the display circuit 123. In some embodiments, the display circuit 123 uses the same graphical depiction (e.g., the same indicator in a horizontal slide control) in the UI element to represent both the current pressure value and the current parameter value, as the two values are linked after unlocking the UI element. This is illustrated in FIGS. 4D and 4E, which show combined indicators for the current pressure and the current parameter value after unlocking the UI element. In FIG. 4D, increasing pressure relatively increases the parameter value from +1.3 (in FIG. 4C) to +2.1, while in FIG. 4E, decreasing pressure relatively decreases the parameter value from, say the +2.1 value in FIG. 4D, to −1.5 (recall that the Exposure parameter in these examples has a range of −4.0 to +4.0).

With further reference to FIG. 3B, the methodology continues with deactivating and locking 215 the UI element in response to a lack of pressure signals received at the touch point of the UI element, which is carried out by the activation and deactivation circuit 111. In some embodiments, removing the applied pressure deactivates and locks the UI element. Since the same UI element is used to decrease the applied pressure (to lower the parameter value) and to stop receiving applied pressure (to stop further changing of the parameter value), a small time window (e.g., between a tenth of a second and a half of a second, which may be settable or configurable, such as by the user) is used to make the determination. If the applied pressure never hits zero (or some set or predetermined minimum amount) during the window, normal updating of the parameter takes place. Otherwise, updating is stopped, the UI element is deactivated and locked, and the parameter value returns or maintains the same value as it was at the start of the time period.

For example, with a deactivation period of 0.3 seconds, in some embodiments, decreases in the changing of the parameter value is delayed by 0.3 seconds, and the UI element is deactivated and locked when the applied pressure goes to zero, leaving the parameter value at the value corresponding to the applied pressure 0.3 seconds earlier. In other embodiments, the changing of the parameter value continues to take place during the deactivation period, but upon detecting no applied pressure, the parameter value resets to the value it held 0.3 seconds earlier.

Activation parameters are configurable (such as by the user) in some embodiments. For example, in some embodiments, the minimum amount of pressure needed to activate a UI element may be any value (such as a configurable value) between the minimum detectable pressure (e.g., more than noise) and one quarter of the maximum pressure. For further example, in some embodiments, the minimum period to activate a UI element may be any value (such as a configurable value) between a tenth of a second and a half of a second. In a similar fashion, deactivation times or delays may be set similarly, including using the same time as the activation time or being a different, possibly configurable, time.

As will be appreciated, each of the circuits 111 through 117 and 123 may be implemented in various ways. In one example embodiment, one or more of the circuits are implemented with software instructions executing on one or more processors. In this sense, the combination of software and the one or more processors provide a functional and structural circuit configured to carry out the functionality as variously provided herein. In another example embodiment, one or more of the circuits are implemented with gate-level logic or other suitable hardware (e.g., a field programmable gate array, an application-specific integrated circuit, or a purpose-built semiconductor). In such cases, the hardware circuits can be configured to process logical ones and zeros much in the same way software operates to carry out the functionality as variously provided herein, albeit potentially faster depending on clocking speeds, but at a possibly greater production cost.

In another example embodiment, one or more of the circuits are implemented as a microcontroller having input/output ports along with a number of executable routines embedded therein and executable by an onboard processor. The microcontroller could thus receive the pressure signals, process the conversion to corresponding parametric values, and control the activation and unlocking of the UI element and the display of the pressure signals and the current parameter value.

As will be further appreciated, the degree of modularity or integration can vary from one embodiment to the next, and the present disclosure is not intended to be limited to the specific configurations shown in FIGS. 2A and 2B. For example, in other embodiments, all of circuits 111 through 117 and 123 are implemented in a single functional circuit, rather than the individual discrete circuits as shown. Likewise, in some embodiments, each of circuits 111 through 117 is implemented within circuit 123. Further note that the functionality of the circuits may also be captured in a computer program product having one or more non-transitory machine-readable mediums having instructions encoded thereon that when executed by one or more processors cause the corresponding functionality to be carried out. Numerous other such embodiments, configurations, and instantiations of the subject matter provided herein will be appreciated in light of this disclosure.

As will be appreciated in light of this disclosure, changes to a value of a parameter from a current value using a pressure sensitive user interface (UI) element of a display screen can be performed by a computer-implemented method or system. So, for instance, in some embodiments, the activation and deactivation circuit 111 is programmed to identify when the UI element has been activated or deactivated. For example, the activation and deactivation circuit 111 may be programmed to indicate when a non-noise level of pressure has been applied to the touch point 122, and for enough time that it appears the user is trying to activate the pressure sensitive sensor (e.g., a quarter of a second). At this point, in some embodiments, the activation and deactivation circuit 111 is further programmed to activate the UI element after such an occurrence. A similar technique may be used to deactivate the UI element, only using a noise level of pressure as an indication to deactivate (and lock, if appropriate) the UI element from further change. The present disclosure is not limited thereto, however, and in other embodiments, the activation and deactivation circuit 111 activates or deactivates the UI element in response to another stimulus, such as another button or icon press intended to activate or deactivate the UI element.

In a similar fashion, in some embodiments, the conversion circuit 113 is programmed to convert pressure signals to corresponding parameter values. By way of example, in some embodiments, the pressure signals take on a range (from a minimum to a maximum applied pressure), and this range is mapped correspondingly (such as a proportional or linear mapping) to the range of available parameter values (from a minimum to a maximum parameter value). The conversion circuit 113 is then programmed to convert the received pressure signals from the touch point 122 into their corresponding parameter values using this mapping. In some embodiments, the conversion circuit 113 is further programmed to supply these converted parameter values to the change circuit 117 after unlocking the UI element 121 (so that the change circuit 117 may update the value of the parameter), and to supply these values to the display circuit 123 (so that the display circuit 123 may cause display of these converted parameter values graphically alongside the current parameter value).

Figure 5A:
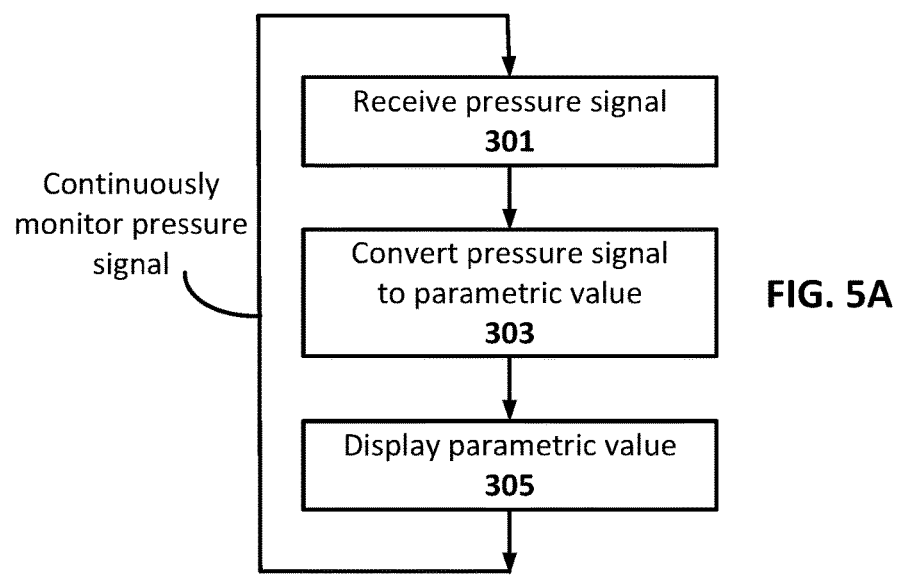
FIGS. 5A through 5C illustrate example methodologies for presenting, as part of an activated UI element, parametric values as feedback from the pressure signals, in accordance with an embodiment of the present disclosure.
Figure 5B:
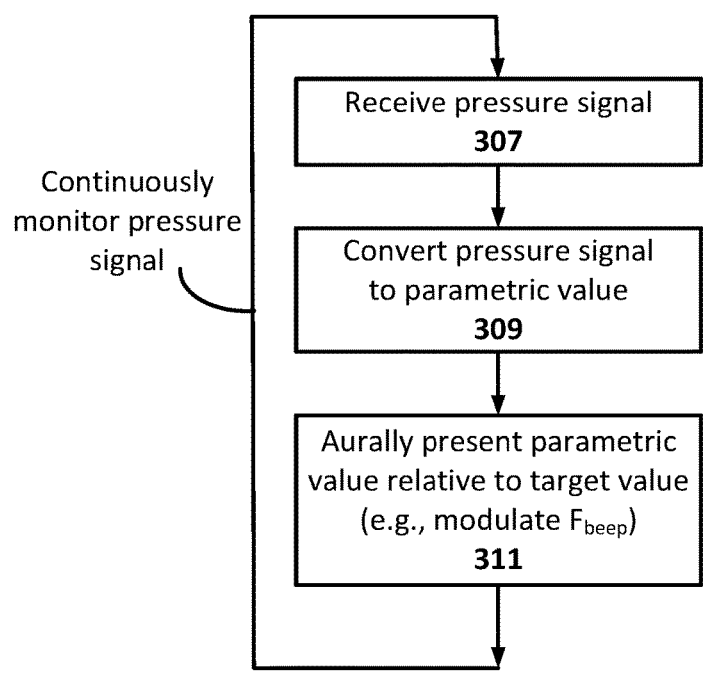
Figure 5C:
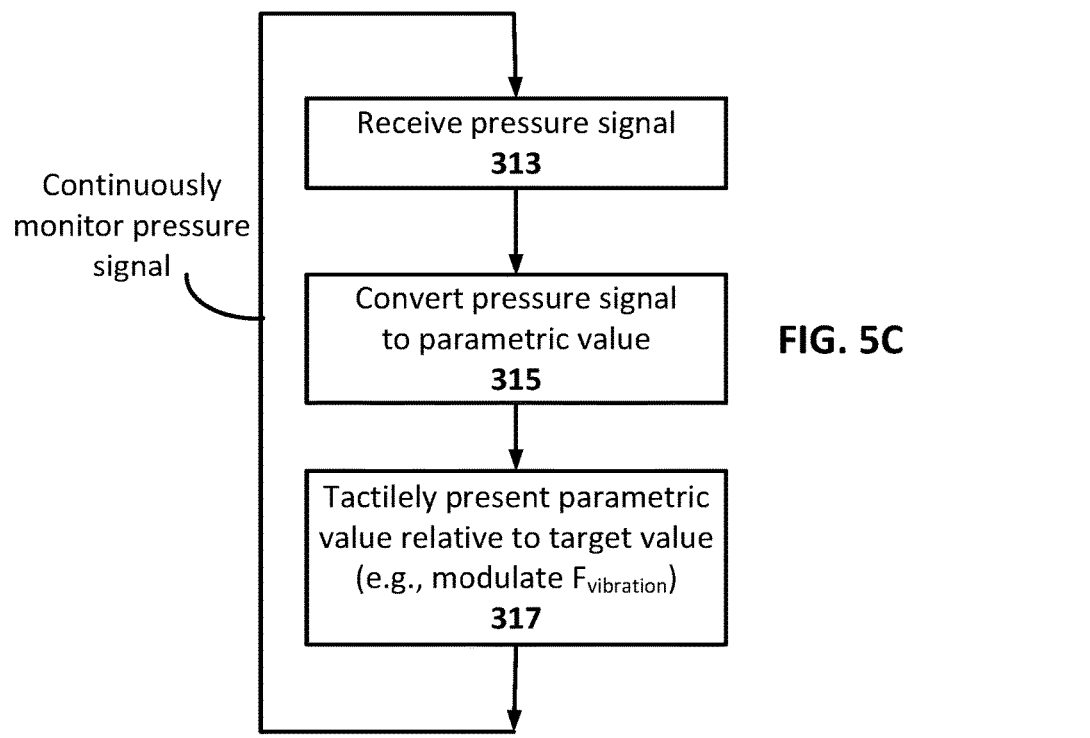

FIGS. 5A through 5C illustrate example methodologies for presenting, as part of an activated UI element, parametric values as feedback from the pressure signals, in accordance with an embodiment of the present disclosure.

As can be seen in FIG. 5A, the feedback is provided visually presenting the parametric values. In the example case shown, the method includes receiving 301 a pressure signal, converting 303 that pressure signal to a parametric value, and displaying 305 that parametric value. As previously explained, the parametric value can be displayed (e.g., graphically or digitally) on or otherwise near the pressure sensitive UI control feature in some embodiments. In other embodiments, the parametric value is displayed in a relatively large area that is easy to see (away from the user's contact point on the pressure sensitive surface). In some embodiments, the parametric value is displayed along with the target value to further assist the user in achieving a match sufficient to unlock the UI control feature. Numerous such display scenarios can be used here, as will be appreciated in light of this disclosure.

As can be seen in FIG. 5B, the feedback is provided by aurally presenting the parametric values. In the example case shown, the method includes receiving 307 a pressure signal, converting 309 that pressure signal to a parametric value, and aurally presenting 311 that parametric value relative to the target value. So, for instance, a speaker of the device or system on which the methodology is being executed can be used to aurally present a beeping tone, wherein the closer the parametric value gets to the target value, the higher the beep frequency ($F_{beep}$). In other embodiments, the closer the parametric value gets to the target value, the lower the beep frequency. In either case, once the parametric value is within sufficient range of the target value, the beep frequency can transition to a continuous tone, for example. Numerous such aural presentation feedback schemes can be used here, as will be appreciated in light of this disclosure.

As can be seen in FIG. 5C, the feedback is provided by tactilely presenting the parametric values. In the example case shown, the method includes receiving 313 a pressure signal, converting 315 that pressure signal to a parametric value, and tactilely presenting 317 that parametric value relative to the target value. So, for instance, a haptic element of the device or system on which the methodology is being executed can be used to tactilely present a vibration, wherein the closer the parametric value gets to the target value, the higher the vibration frequency ($F_{vibration}$). In other embodiments, the closer the parametric value gets to the target value, the lower the vibration frequency. In either case, once the parametric value is within sufficient range of the target value, the vibration frequency can transition to a non-vibration or very high frequency tone, for example. Tactile displays are configured to provide such haptic feedback in response to user touch-based input, for example. Numerous such tactile presentation feedback schemes can be used here, as will be appreciated in light of this disclosure.

Further Example Embodiments

Numerous further example variations and configurations will be apparent in light of this disclosure.

Example 1 is a computer-implemented method for relatively changing a value of a parameter from a first value using a pressure sensitive user interface (UI) element of a display screen. The method includes: activating the UI element in response to pressure signals received at a touch point of the UI element; converting the pressure signals to corresponding parametric values of the parameter concurrently with the receiving of the pressure signals; presenting, as part of the activated UI element, the parametric values as feedback from the pressure signals concurrently with the converting of the pressure signals; unlocking the activated UI element when the parametric values fall within a first window of the first value for a first time period; after the unlocking of the activated UI element, relatively changing the value of the parameter from the first value to the parametric values concurrently with the presenting of the parametric values; and deactivating and locking the UI element in response to a lack of pressure signals received at the touch point of the UI element.

Example 2 includes the subject matter of Example 1 or 2, wherein presenting the parametric values as feedback from the pressure signals comprises at least one of: displaying (or causing display of), as part of the activated UI element, the first value as the value of the parameter; and displaying (or causing display of), as part of the unlocked UI element, the parametric values as the value of the parameter concurrently with the relatively changing of the value of the parameter.

Example 3 includes the subject matter of Example 1, wherein the parameter controls an aspect of an electronic device or an application executing on the electronic device, and the relatively changing of the value of the parameter comprises changing the aspect of the electronic device or the application concurrently with the relatively changing of the value of the parameter.

Example 4 includes the subject matter of any of the preceding Examples, wherein the activated UI element comprises a graphical depiction of the value of the parameter and of the feedback from the pressure signals.

Example 5 includes the subject matter of Example 4, wherein after the unlocking of the activated UI element, the graphical depiction of the value of the parameter is the same as the graphical depiction of the feedback from the pressure signals.

Example 6 includes the subject matter of Example 4 or 5, wherein the graphical depiction includes a range of the value of the parameter.

Example 7 includes the subject matter of any of Examples 4 through 6, wherein the graphical depiction includes a linear slider or a rotatable knob or needle, the method further comprising controlling the value of the parameter in response to touch signals applied to the linear slider or the rotatable knob or needle.

Example 8 includes the subject matter of any of the preceding Examples, wherein presenting the parametric values as feedback from the pressure signals comprises at least one of: visually presenting the parametric values; aurally presenting the parametric values; and tactilely presenting the parametric values.

Each of Examples 9 through 16 is a computer program product including one or more non-transitory machine readable mediums encoded with instructions that when executed by one or more processors cause a process to be carried out for relatively changing a value of a parameter from a first value using a pressure sensitive user interface (UI) element of a display screen, the process including the method of any of the previous Examples. The machine-readable medium(s) may be any non-transitory means for storing processor-executable instructions, such as a hard-drive, read only memory (ROM), random access memory (RAM), compact disc, server computing system, thumb drive, magnetic tape, on-board memory, hardware register, processor cache memory, flash memory, and solid-state memory, to name a few physical memory examples.

Example 17 is a system for relatively changing a value of a parameter from a first value. The system includes a display screen. The display screen includes: a pressure sensitive user interface (UI) element having a touch point to receive pressure signals; and a display circuit to cause display of the UI element on the display screen. The system further includes: an activation and deactivation circuit to activate the UI element in response to the pressure signals; and a conversion circuit to convert the pressure signals to corresponding parametric values concurrently with receiving the pressure signals. The display circuit further causes display of the activated UI element on the display screen by: causing the display of the first value as the value of the parameter; and presenting the parametric values as feedback from the pressure signals concurrently with converting the pressure signals and with displaying the first value. The system still further includes: an unlocking circuit to unlock the activated UI element when the parametric values fall within a first window of the first value for a first time period; and a change circuit to relatively change the value of the parameter from the first value to the parametric values concurrently with displaying the parametric values after unlocking the activated UI element. The display circuit further causes display of the unlocked UI element on the display screen by causing display of the parametric values as the value of the parameter concurrently with relatively changing the value of the parameter. The activation and deactivation circuit deactivates and locks the UI element in response to a lack of pressure signals received at the touch point of the UI element.

Example 18 includes the subject matter of Example 17, wherein the correspondence of the parametric values to the pressure signals is a proportional correspondence.

Example 19 includes the subject matter of Example 17 or 18, wherein the parameter controls an aspect of a device or application, and the aspect of the device or application changes correspondingly and concurrently with relatively changing the value of the parameter.

Example 20 includes the subject matter of any of Examples 17 through 19, wherein the activated UI element includes a graphical depiction of the value of the parameter and of the presented feedback from the pressure signals.

Recall the feedback can be presented by, for example, visual presentation, audible presentation, and/or tactile presentation.

Example 21 includes the subject matter of Example 20, wherein after unlocking the activated UI element, the graphical depiction of the value of the parameter is the same as the graphical depiction of the presented feedback from the pressure signals.

Example 22 includes the subject matter of Example 20 or 21, wherein the graphical depiction includes a range of the value of the parameter.

Example 23 includes the subject matter of any of Examples 20 through 22, wherein the graphical depiction includes a linear slider or a rotatable knob or needle.

Example 24 includes the subject matter of any of Examples 17 through 23, and further includes a control circuit to control the value of the parameter in response to touch signals, such as the touch signals applied to the linear slider or the rotatable knob or needle of Example 23 or some other graphical user interface feature.

The foregoing description of example embodiments of the present disclosure has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

What is claimed is:

1. A computer-implemented method for using a pressure sensitive user interface (UI) element of a display screen, the method comprising:
    activating the UI element in response to pressure signals received at a touch point on the display screen, wherein the activated UI element includes a first indicator of a pressure value, and a second indicator of a current value of a parameter;
    in response to continued receipt of the pressure signals after the UI element is activated, modifying the pressure value and manipulating the corresponding first indicator;
    unlocking the activated UI element when the pressure value falls within a first window of the current value for a first time period, wherein the first and second indicators overlap to form a combined indicator after the activated UI element is unlocked;
    in response to continued receipt of the pressure signals after the UI element is unlocked, modifying the current value and manipulating the corresponding second indicator; and
    deactivating and locking the UI element in response to a lack of pressure signals received at the touch point of the UI element,
    wherein after the UI element is activated but before the UI element is unlocked, the first indicator is movable in response to the pressure signals, and second indicator remains stationary.

2. The method of claim 1, further comprising displaying, as part of the activated UI element, the current value of the parameter.

3. The method of claim 1, wherein
    the parameter corresponds to an aspect of an electronic device or an application executing on the electronic device, and
    modifying the current value of the parameter comprises changing the aspect of the electronic device or the application.

4. The method of claim 1, wherein the activated UI element comprises a graphical depiction of feedback from the pressure signals.

5. The method of claim 4, wherein the graphical depiction indicates a range of values that can be assigned to the parameter.

6. The method of claim 4, wherein the graphical depiction is selected from a group consisting of a linear slider, a rotatable knob, and a rotatable needle.

7. The method of claim 1, further comprising at least one of:
aurally presenting the current value of the parameter; or
tactilely presenting the current value of the parameter.

8. A computer program product including one or more non-transitory machine readable mediums encoded with instructions that when executed by one or more processors cause a process to be carried out for using a pressure sensitive user interface (UI) element of a display screen, the process comprising:
activating the UI element in response to pressure signals received at a touch point on the display screen, wherein the activated UI element includes a first indicator of a pressure value, and a second indicator of a current value of a parameter;
in response to continued receipt of the pressure signals after the UI element is activated, modifying the pressure value and manipulating the corresponding first indicator;
unlocking the activated UI element when the pressure value falls within a first window of the current value for a first time period, wherein the first and second indicators overlap to form a combined indicator after the activated UI element is unlocked;
in response to continued receipt of the pressure signals after the UI element is unlocked, modifying the current value and manipulating the corresponding second indicator; and
deactivating and locking the UI element in response to a lack of pressure signals received at the touch point of the UI element,
wherein after the UI element is activated but before the UI element is unlocked, the first indicator is movable in response to the pressure signals, and the second indicator remains stationary.

9. The computer program product of claim 8, wherein the process further comprises causing display of, as part of the unlocked UI element, the current value of the parameter.

10. The computer program product of claim 8, wherein the parameter corresponds to an aspect of an electronic device or an application executing on the electronic device, and
modifying the current value of the parameter comprises changing the aspect of the electronic device or the application.

11. The computer program product of claim 8, wherein the activated UI element comprises a graphical depiction of feedback from the pressure signals.

12. The computer program product of claim 11, wherein the graphical depiction indicates a range of values that can be assigned to the parameter.

13. The computer program product of claim 11, wherein the graphical depiction is selected from a group consisting of a linear slider, a rotatable knob, and a rotatable needle.

14. The computer program product of claim 8, wherein the process further comprises causing display of, as part of the activated UI element, the current value of the parameter.

15. A system for manipulating a value, the system comprising:
a display screen including a pressure sensitive user interface (UI) element having a touch point to receive pressure signals;
a display circuit to cause display of the UI element on the display screen;
an activation and deactivation circuit to activate the UI element in response to the pressure signals, wherein the activated UI element includes a first indicator of a pressure value, and a second indicator of a current value of a parameter;
a conversion circuit to convert the pressure signals to corresponding values concurrently with receipt of the pressure signals, wherein, in response to continued receipt of the pressure signals after the UI element is activated, the display circuit modifies the pressure value and manipulates the corresponding first indicator; and
an unlocking circuit to unlock the activated UI element when the pressure value falls within a first window of the current value for a first time period, wherein the first and second indicators overlap to form a combined indicator after the activated UI element is unlocked;
wherein, in response to continued receipt of the pressure signals after the UI element is unlocked, the display circuit modifies the current value and manipulates the corresponding second indicator,
wherein the activation and deactivation circuit deactivates and locks the UI element in response to a lack of pressure signals received at the touch point of the UI element; and
wherein after the UI element is activated but before the UI element is unlocked, the first indicator is movable in response to the pressure signals, and the second indicator remains stationary.

16. The system of claim 15, wherein the activated UI element includes a graphical depiction of feedback from the pressure signals.

17. The system of claim 16, wherein the graphical depiction is selected from a group consisting of a linear slider, a rotatable knob, and a rotatable needle.

* * * * *